(12) United States Patent
Nakayama

(10) Patent No.: US 9,107,237 B2
(45) Date of Patent: Aug. 11, 2015

(54) COMMUNICATION CONTROL METHOD AND A MOBILE COMMUNICATION TERMINAL

(75) Inventor: Junya Nakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 874 days.

(21) Appl. No.: 13/263,752

(22) PCT Filed: Apr. 14, 2010

(86) PCT No.: PCT/JP2010/056964
§ 371 (c)(1),
(2), (4) Date: Oct. 10, 2011

(87) PCT Pub. No.: WO2010/119983
PCT Pub. Date: Oct. 21, 2010

(65) Prior Publication Data
US 2012/0033607 A1 Feb. 9, 2012

(30) Foreign Application Priority Data

Apr. 17, 2009 (JP) ................................ 2009-100880

(51) Int. Cl.
*H04W 4/00* (2009.01)
*H04W 88/04* (2009.01)
*H04W 48/06* (2009.01)
*H04W 68/00* (2009.01)

(52) U.S. Cl.
CPC .............. *H04W 88/04* (2013.01); *H04W 48/06* (2013.01); *H04W 68/00* (2013.01)

(58) Field of Classification Search
CPC . H04L 12/2834; H04L 12/2836; H04L 12/66; H04L 12/06272; H04B 7/15507; H04W 88/04; H04W 88/06
See application file for complete search history.

(56) References Cited

U.S. PATENT DOCUMENTS

2005/0286476 A1    12/2005  Crosswy et al.
2008/0139239 A1     6/2008  O'Connor

FOREIGN PATENT DOCUMENTS

| | | |
|---|---|---|
| JP | 2003152612 A | 5/2003 |
| JP | 2005269033 A | 9/2005 |
| JP | 2005-348397 A | 12/2005 |
| JP | 2006-5824 A | 1/2006 |
| JP | 2006135874 A | 5/2006 |
| JP | 2007053483 A | 3/2007 |
| WO | 2004043008 A1 | 5/2004 |
| WO | 2006068878 A | 6/2006 |
| WO | 2006083788 A1 | 8/2006 |

OTHER PUBLICATIONS

International Search Report for PCT/JP2010/056964 mailed May 18, 2010.
Japanese Office Action for JP Application No. 2011-509385 mailed on Oct. 22, 2013 with partial English Translation.
Extended European Search Report of EP Application No. 10764564.0 dated Mar. 23, 2015.

*Primary Examiner* — Alvin Zhu
(74) *Attorney, Agent, or Firm* — Sughrue Mion, PLLC (57) ABSTRACT

The degree of freedom of the location in which a wireless LAN is built is raised. When a connection request to an external network from a user terminal is detected, a mobile communication terminal connects with the external network by mobile communication and relays the communication between the external network and the user terminal.

5 Claims, 6 Drawing Sheets

| RECEIVED STRENGTH OF MOBILE COMMUNICATION | UPPER LIMIT OF CONNECTION NUMBERS OF USER TERMINALS |
|---|---|
| STRONG | NO LIMITATION |
| MIDDLE | UP TO 2 UNITS |
| WEAK | UP TO 1 UNIT |

Fig.6

COMMUNICATION CONTROL METHOD AND A MOBILE COMMUNICATION TERMINAL

TECHNICAL FIELD

The present invention relates to the technology for connecting with an external network using a wireless LAN (Local Area Network).

BACKGROUND ART

The number of users has been increasing who enjoy internet connection for a user terminal such as a cellular phones and a game machine via a wireless LAN. By using a wireless LAN, the user can expand his moving range compared with a case of a wire base connection.

An access point (hereinafter, referred to as "AP") for connecting user terminals to an external network such as the internet is provided for a wireless LAN. The technology that the AP with the cradle function performs authentication processing for the terminal by the opportunity of charging for a user terminal is proposed in the patent document 1, for example, concerning to AP.

CITATION LIST

Patent Document

[Patent document 1] Japanese Patent Application Laid-Open No. 2006-135874 (FIG. 7 etc.)

SUMMARY OF INVENTION

Technical Problem

Convenience of a wireless LAN rises by incorporating the various functions in an apparatus as the AP like the technology described in the above-mentioned patent document 1. However, the technology described in the document has the defect that the communication service area of a wireless LAN is fixed because the AP as a connection apparatus is connected to a switching apparatus using wire.

Accordingly, the object of the present invention is to provide a communication control method and a mobile communication terminal for obtaining the larger degree of freedom of the location of setting a wireless LAN and for settling the above-mentioned defect.

Solution to Problem

When a mobile communication terminal detects a connection request to an external network from a user terminal which is connected to a wireless LAN, the communication control method according to the present invention relays the communication between the external network and the user terminal by connecting to the external network by mobile communication.

A mobile communication terminal according to the present invention comprises a mobile communication means which connects with an external network by mobile communication and a wireless LAN communication means. The mobile communication terminal according to the present invention has a control means which instructs said mobile communication means and said wireless LAN communication means to connect with said external network by mobile communication and relays the communication of said user terminal to the external network when the mobile communication terminal detects a connection request to said external network from user terminal which connected with a wireless LAN.

A program recording medium in which a program according to the present invention was recorded makes a computer as a mobile communication terminal carry out a step which connects with said external network by mobile communication and relays the communication of said user terminal to the external network when a connection request to an external network from user terminal which connected with a wireless LAN is detected.

Advantageous Effects of Invention

According to the present invention, the degree of freedom of the location where a wireless LAN is built.

DESCRIPTION OF EXEMPLARY EMBODIMENT

The First Exemplary Embodiment

Figure 1:
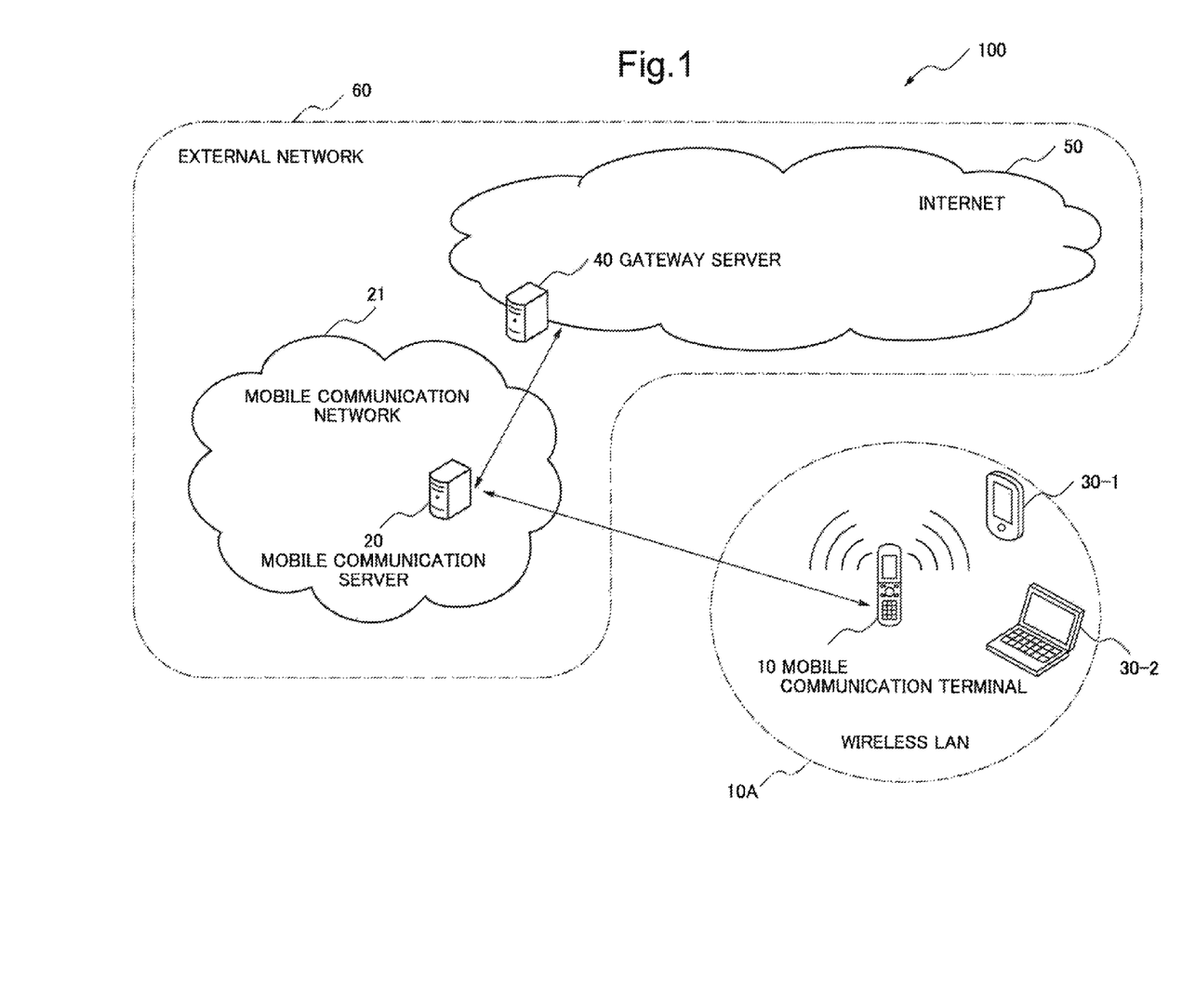
FIG. 1 is a configuration diagram of a system in the first exemplary embodiment of the present invention.

The composition of the system 100 in the first embodiment of the present invention is shown in FIG. 1. Mobile communication terminal 10 communicates with server 20 of mobile communication network 21 of a communication carrier which the user has contracted by mobile communication. The server 20 connects mobile communication terminal 10 to internet 50 via gateway server 40.

Mobile communication terminal 10 operates as the AP of wireless LAN 10A to a game machine with wireless LAN function and user terminal 30 (30-1 and 30-2) such as a small PC (personal computer) while the mobile communication terminal 10 performs the above-mentioned mobile communication. Further, external network 60 indicates the set (21, 50) of the network other than the wireless LAN 10A.

Figure 2:
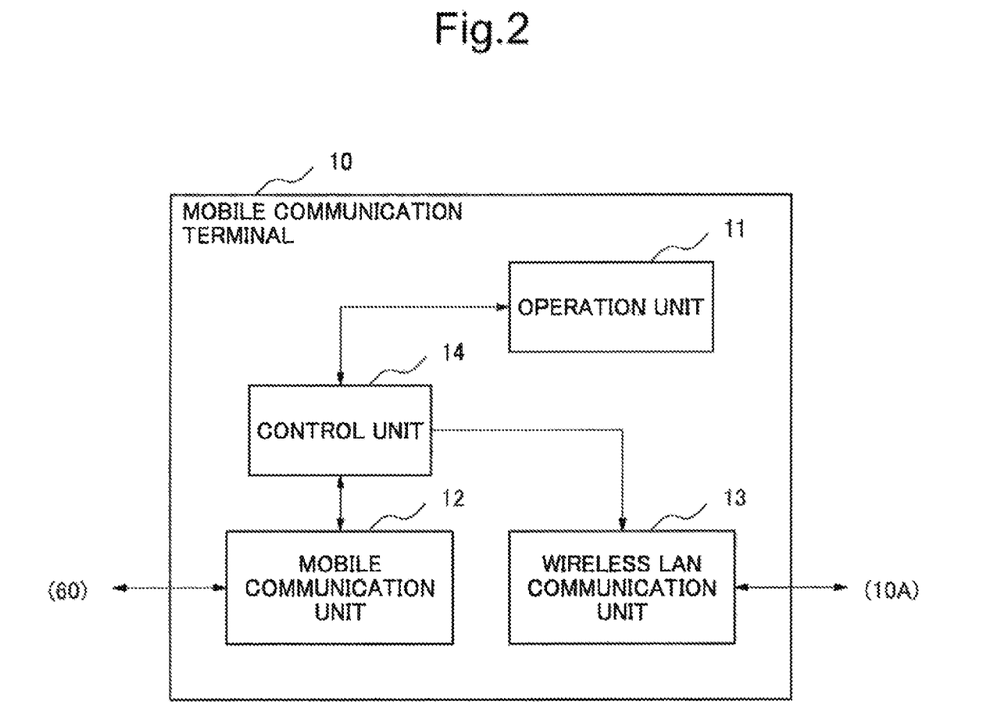
FIG. 2 is a block diagram of a mobile communication terminal in the first exemplary embodiment of the present invention.

The composition of mobile communication terminal 10 is shown in FIG. 2. The mobile communication terminal 10 in the present exemplary embodiment is a mobile phone which is capable of mobile communication such as voice and data communications. Operation unit 11 is an operating means for inputting directions from the user to the mobile communication terminal 10. Mobile communication unit 12 performs the mobile communication for voice and data communications to the destination station in the external network 60. Wireless LAN communication unit 13 performs the processing (hereinafter, referred to as "AP processing") for enabling the mobile communication terminal 10 to work as an AP such as beacon signal sending and registration of user terminal 30 connecting with wireless LAN 10A. Control unit 14 activates mobile communication unit 12 and wireless LAN communication unit 13 following to the procedure mentioned later.

Figure 3:
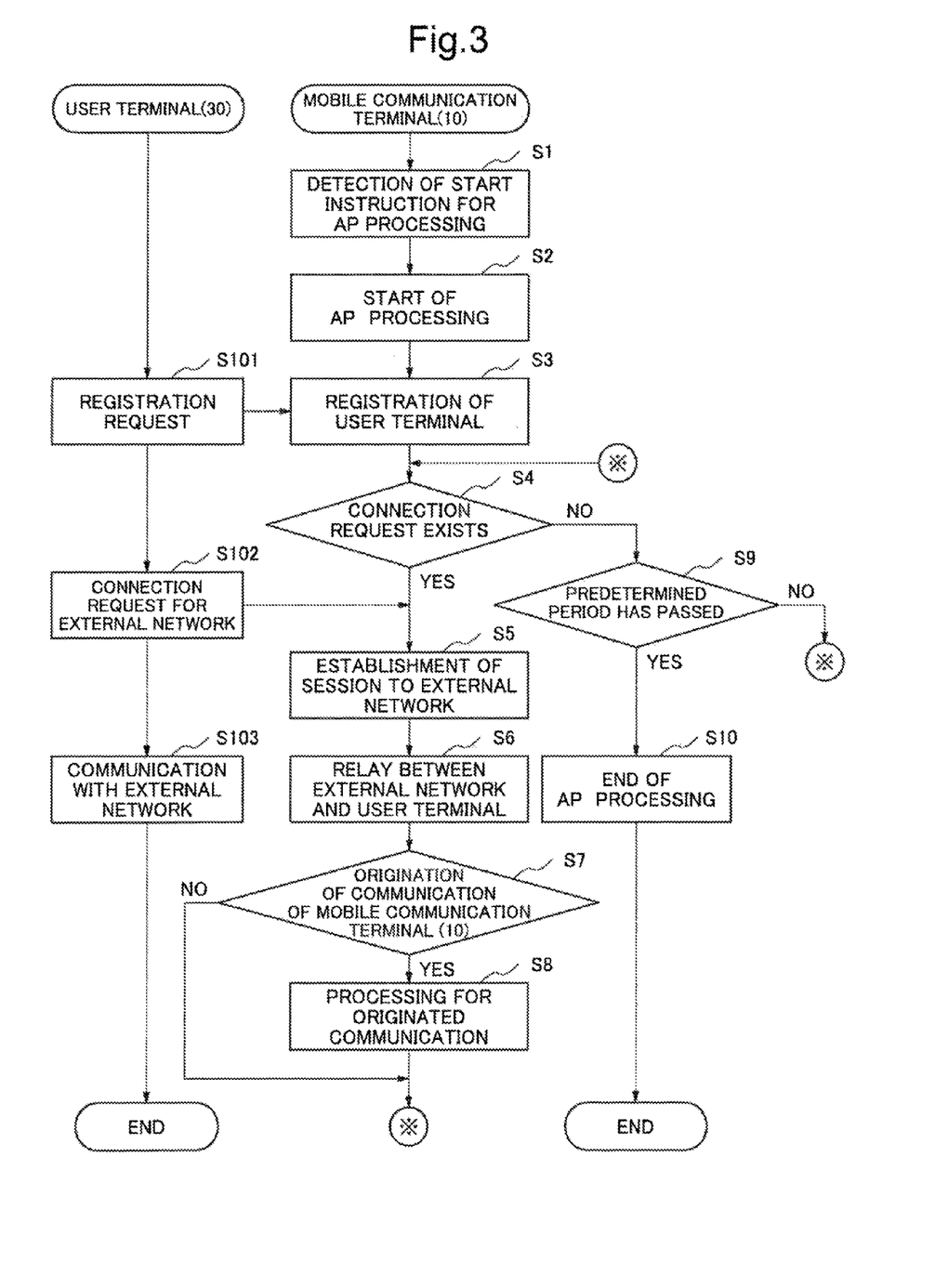
FIG. 3 is a flowchart of a mobile communication terminal in the first exemplary embodiment of the present invention.

Referring to a flowchart shown in FIG. 3, the operation of the mobile communication terminal 10 with the aforementioned composition is described. When user terminal 30 is connected to the internet 50 using wireless LAN 10A, the user of the mobile communication terminal 10 inputs the start of the AP processing by the operation unit 11.

When the above-mentioned input is recognized (Step S1), the mobile communication terminal 10 initiates the AP processing (Step S2) by starting wireless LAN communication unit 13. And whenever a registration request (Step S101) is received from user terminal 30, user terminal 30 is registered as terminal station (Step S3).

The mobile communication terminal 10 monitors whether a connection request to internet 50 by user terminal 30 occurs (Step S4) and when the connection request has occurred (Step S102), the mobile communication terminal 10 connects with the mobile communication server 20 and establishes a communication session for user terminal 30 (Step S5). When the session is established, the mobile communication terminal 10 relays the communication between the internet 50 and the user terminal 30 (Step S6). As a result, the user terminal 30 is connected to the internet 50 via a wireless LAN (Step S103).

More specifically, in mobile communication terminal 10, for example, when the wireless LAN communication unit 13 receives communication data from the user terminal 30, the data is transmitted to the mobile communication server 20 by the mobile communication unit 12. When the mobile communication unit 12 receives the communication data for the user terminal 30 via the mobile communication server 20 from the internet 50, the communication data is transmitted to user terminal 30 by wireless LAN communication unit 13.

In parallel with AP processing as described above, the mobile communication terminal 10 also monitors the occurrence of mobile communication in the mobile communication terminal (10) (Step S7). For example, they are the occurrences of transmitting and receiving of a call, transmitting and receiving of an e-mail and the internet connection in the mobile communication terminal 10. In these communications, the mobile communication terminal 10 connects with the external network 60 as terminal station which is different from the user terminal 30.

When such mobile communication occurs, the mobile communication terminal 10 executes the processing for the mobile communication in parallel with the AP processing (Step S6). That is, in case of originating call for example, the mobile communication terminal 10 establishes a new communication session for a call by the mobile communication terminal (10) while the mobile communication terminal 10 moves to the processing to accept the incoming call in case of the call arrival.

On the other hand, when a predetermined period has passed in the state without the connection request (Step S4: No) from any user terminal 30 (Step S9: Yes), the mobile communication terminal 10 terminates the AP processing (Step S10). As a result, all registrations of the user terminal 30 are deleted. Since the periodic processing such as the beacon transmission becomes unnecessary with the termination of the AP processing, the battery consumption of the mobile communication terminal 10 can be suppressed.

Further, the registration per user terminal 30 may be deleted by monitoring the registration state with no connection request after the registration per user terminal 30. In this case, for example, when all registrations have been deleted, it can be set so that the AP processing may be terminated.

According to the first embodiment, a user can connect to the internet at any desired location from a wireless LAN and the degree of freedom of the location where the wireless LAN is built is raised by operating the mobile communication terminal 10 as the AP of the user terminal 30. While the mobile communication terminal 10 works as the AP of user terminal 30, the mobile communication terminal 10 can also be used as another terminal station which is different from the user terminal 30. Therefore, the convenience for users is raised compared with an apparatus dedicated for only AP.

The Second Exemplary Embodiment

As above-mentioned, the mobile communication terminal 10 can perform its mobile communication in parallel with the AP processing for the user terminal 30. However, depending on the processing performance of the mobile communication terminal 10 and the number of connections of the user terminal 30, the mobile communication terminal 10 might be overloaded. The control taking such situation in consideration will be described below.

Figure 4:
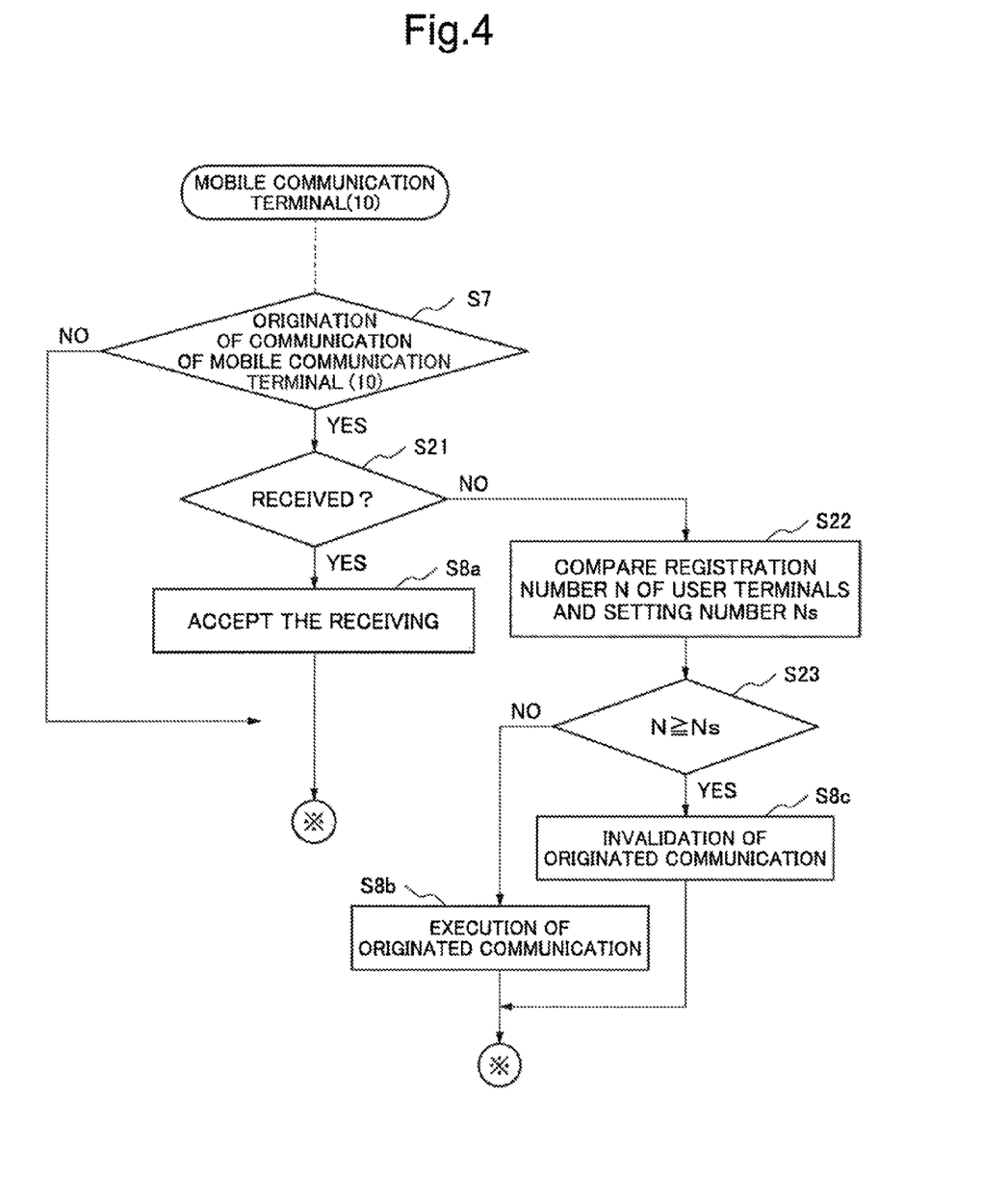
FIG. 4 is a flowchart of a mobile communication terminal in the second embodiment of the present invention.

With referring to the flowchart shown in FIG. 4, the operation of mobile communication terminal 10 of the second embodiment is described. Here, the modified portion from the above-mentioned embodiment (FIG. 3) is described.

When mobile communication of the mobile communication terminal occurs (Step S7: Yes), the mobile communication terminal 10 distinguishes whether the mobile communication is an arrival of a telephone call or an e-mail (Step S21). When the mobile communication is the arrival, the mobile communication terminal 10 performs the processing for accepting the arrival (Step S8a). For example, when the mobile communication is the telephone call arrival, the mobile communication terminal 10 transmits a response signal following to the predetermined call control protocol and makes a ringtone rumble. In case of a mail arrival, the mobile communication terminal 10 receives the mail from a server.

On the other hand, when the communication of mobile communication terminal 10 itself is not the arrival such as the call origination or the spontaneous internet connection (Step S21: No), the mobile communication terminal 10 compares the value (Ns) set in advance and the present number of registrations (N) about the number of registration of the user terminal 30 (Step S22). As a result of the comparison, when the present number of registrations is less than the set value (Step S23: No), the communication which has occurred in this time is carried out (Step S8b).

When the present number of registrations reaches the set value (Step S23: No), the mobile communication terminal 10 processes so that the communication which has occurred this time is disabled (Step S8c). For example, the effect that call origination and the internet connection are not allowed is shown to the mobile communication terminal 10 and the directions inputted from the user are deleted.

By the above-mentioned control, the mobile communication other than the arrival which has occurred in the mobile communication terminal 10 under the AP processing can be restricted according to the number of registrations of the user terminal 30. Further, although the case of the above-mentioned control is that the arrival is not restricted, it is not limited to this, and may be appropriately modified. That is, the restriction may include the arrival or only exclude the mail sending/receiving with light processing load.

A target of restriction may be the number of registrations of the user terminal 30. As a result, it is possible to prevent the AP processing of the mobile communication terminal 10 from being delayed. For example, the battery residual quantity of the mobile communication terminal 10, the quality of the mobile communication (the congestion state) or the strength of the received radio wave can be applied to the condition of the restriction.

Figure 5:
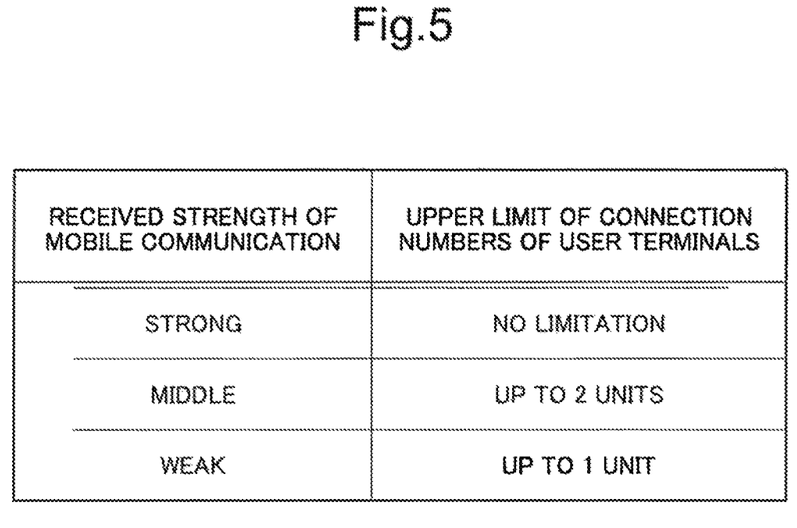
FIG. 5 is an explanation drawing about connection restriction in the second exemplary embodiment of the present invention.

In case that the strength of the received radio wave is the condition, for example, the table as shown in FIG. 5 is set to the mobile communication terminal 10. This table represents the relation between the received radio wave level of the mobile communication and the upper limit of the number of connections of the user terminal 30.

According to the illustrated example, three stages of "Strong", "Middle" and "Weak" are set for the received level. The highest rank "Strong" corresponds to the state that three or more antenna icons, for example, are indicated.

In this state of "Strong", the number of connections of the user terminal 30 is not restricted. In the next rank "Middle" which corresponds to the state indicating almost two antenna icons, the number of connections is limited to up to two in the illustrated example. In the lowest rank "Weak", which indicates the state of one or less antenna icon, the number of connections is restricted up to one.

By the above-mentioned setting, in the situation that receiving the radio wave of the mobile communication is difficult for the mobile communication terminal 10, the traffic volume from mobile communication terminal 10 to external network 60 can be reduced. As a result, the interruption of the internet connection of user terminal 30 whose connection is permitted can be avoided.

Further, the mobile communication terminal 10 may cut the wireless LAN connection in accordance with the predetermined condition, that is, may delete registration of user terminal 30 when the received radio wave level of the mobile communication terminal 10 rapidly changes from "Strong" into "Weak". More specifically, for example, user terminal registered for longer period, or user terminal with larger communication data volume, or specific user terminal, is preferentially cut. As a result, in the environment that the received radio wave level is "Weak", the communication of remaining user terminal 30 appropriately can be maintained.

The above-mentioned control by a table of FIG. 5 and the above-mentioned control described in FIG. 4 may be applied to the mobile communication terminal 10 all together.

The Third Exemplary Embodiment

Next, the third embodiment of the present invention will be described with reference to FIG. 6.

Figure 6:
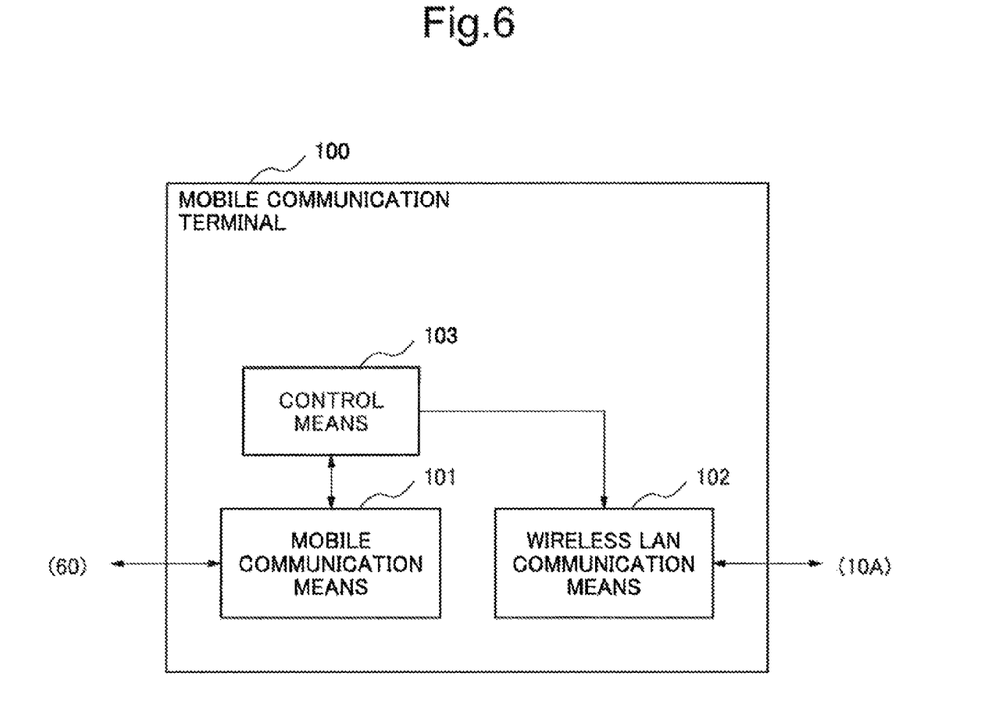
FIG. 6 is a block diagram of a mobile communication terminal in the third exemplary embodiment of the present invention.

The composition of the mobile communication terminal of the third embodiment is shown in FIG. 6.

In FIG. 6, mobile communication terminal 100 is a mobile phone capable of mobile communication such as a telephone call and data communication. Mobile communication means 101 performs mobile communication for telephone call to the destination station and data communication via external network 60. Wireless LAN communication means 102 performs the processing for making the mobile communication terminal 100 work as AP, such as sending beacon signals and registration of user terminal 30 which connects with wireless LAN 10A. Control means 103 operates mobile communication means 101 and wireless LAN communication means 102 according to the procedure mentioned later.

Control means 103 monitors the presence of the connection request to said external network 60 from said user terminal 30. When the connection request is detected, the control means 103 directs said mobile communication means 101 and said wireless LAN communication means 102 to connect with said external network 60 by mobile communication and to relay the communication between said external network 60 and said user terminal 30 as terminal station.

According to the third embodiment, by making the mobile communication terminal 100 operate as the AP of user terminal 30, the user can connect to the internet from a wireless LAN at the desired location, and the degree of freedom of the location where a wireless LAN is built is raised.

The Fourth Exemplary Embodiment

In the communication control method according to the fourth embodiment, a mobile communication terminal starts the processing as an AP of a wireless LAN, registers the user terminal which connects with the wireless LAN, monitors the presence of a connection request for an external network from said user terminal, relays the communication between the external network and said user terminal as a terminal station by connecting to said external network with mobile communication when said connection request is detected and executes the processing for the communication after starting the processing as said access point when the communication between said external network and the terminal as other terminal station.

The Fifth Exemplary Embodiment

The mobile communication terminal according to the fifth embodiment has a mobile communication unit which connects to the external network by mobile communication, a wireless LAN communication unit which executes the processing as a wireless LAN access point and registers the user terminals that connects to the wireless LAN, a control unit which monitors the presence of a connection request from said user terminal to said external network, directs said mobile communication unit and said wireless LAN communication unit to relay the communication between the external network and said user terminal as a terminal station after connection to the external network by mobile communication when said connection request is detected and directs said mobile communication unit to execute the processing for the communication after starting the processing as said access point when the communication occurs between said external network and the terminal as other terminal station.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, according to the above-mentioned exemplary embodiment, although it was assumed that mobile communication terminal 10 is a mobile phone, the present invention is also possible by application to a communication terminal which does not possess the call function such as the small PC and the game machine.

The present invention can be implemented as the computer program corresponding to the operation procedure of mobile communication terminal 10, and recording medium in which the computer program has been stored.

This application is based upon and claims the benefit of priority from Japanese Patent Application No. 2009-100880, filed on Apr. 17, 2009, the disclosure of which is incorporated herein in its entirety by reference.

INDUSTRIAL APPLICABILITY

A communication control method and a mobile communication terminal of the present invention relate to the technology which connects with an external network using a wireless LAN and have the availability on the industry.

REFERENCE SIGNS LIST

100: system
10: mobile communication terminal
10A: wireless LAN
11: operation unit
12: mobile communication unit
13: wireless LAN communication unit
14: control unit
20: mobile communication server
21: mobile communication network
30 (30-1 and 30-2): user terminal
40: gateway server
50: internet
60: external network

The invention claimed is:

1. A communication control method for a mobile communication terminal, comprising:
   connecting to an external network by mobile communication;
   relaying a first communication between said external network and a user terminal when a connection request from said user terminal which has connected with a wireless LAN is detected;
   carrying out processes for a second communication between the external network and the mobile communication terminal and carrying out acceptance processing of call arrival if the second communication is a call arrival from the external network when the second communication occurs;
   registering the user terminal which connects with the wireless LAN;
   comparing a number of registrations of user terminals and a specified value when the second communication is not a call arrival from the external network;
   carrying out the second communication when the number of registrations is less than the specified value;
   carrying out the processing which disables the second communication when the number of registrations reaches the specified value; and
   restricting the number of registrations of said user terminals according to a strength of a received radio wave from the external network.

2. A communication control method according to claim 1, wherein the registration of said user terminal is deleted when there is no connection request from said user terminal during a predetermined period.

3. A communication control method according to claim 1, wherein said second communication is a telephone call.

4. A non-transitory computer readable medium having recorded thereon a program which is executable by a computer for performing the method of claim 1.

5. A mobile communication terminal, comprising:
   a mobile communication unit configured to connect to an external network by mobile communication;
   a wireless LAN communication unit; and
   a control unit configured to control the mobile communication unit and the wireless LAN communication unit to relay a first communication between said external network and a user terminal when a connection request from said user terminal which has connected with a wireless LAN is detected,
   wherein the control unit is further configured to control the mobile communication unit to carry out processes for a second communication between the external network and the mobile communication terminal and to carry out acceptance processing of call arrival if the second communication is a call arrival from the external network when the second communication occurs;
   wherein the wireless LAN communication unit is configured to register the user terminal which connects with the wireless LAN;
   wherein the control unit is further configured to compare a number of registrations of user terminals and a specified value when the second communication is not a call arrival from the external network, to carry out the second communication when the number of registrations is less than the specified value, and to carry out the processing which disables the second communication when the number of registrations reaches the specified value; and
   wherein the control unit is further configured to restrict the number of registrations of said user terminals according to a strength of a received radio wave from the external network.

* * * * *